US009880678B2

(12) United States Patent
Yin et al.

(10) Patent No.: US 9,880,678 B2
(45) Date of Patent: Jan. 30, 2018

(54) TOUCH SENSOR LAYER AND DISPLAY DEVICE

(71) Applicant: Ye Xin Technology Consulting Co., Ltd., Hsinchu (TW)

(72) Inventors: Hsiao-Min Yin, Hsinchu (TW); Yao-Pin Hsu, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 311 days.

(21) Appl. No.: 14/635,786

(22) Filed: Mar. 2, 2015

(65) Prior Publication Data

US 2016/0231842 A1    Aug. 11, 2016

(30) Foreign Application Priority Data

Feb. 5, 2015 (TW) .............................. 104103976 A

(51) Int. Cl.
    *G06F 3/044*      (2006.01)

(52) U.S. Cl.
    CPC .... *G06F 3/044* (2013.01); *G06F 2203/04112* (2013.01)

(58) Field of Classification Search
    CPC ....................................................... G06F 3/044
    See application file for complete search history.

(56) References Cited

U.S. PATENT DOCUMENTS

| | | | | |
|---|---|---|---|---|
| 2011/0310033 A1* | 12/2011 | Liu | ........................ | G06F 3/044 345/173 |
| 2012/0127414 A1* | 5/2012 | Shin | ..................... | G06F 3/0412 349/139 |
| 2012/0274602 A1* | 11/2012 | Bita | ..................... | G02B 26/001 345/174 |
| 2014/0083751 A1* | 3/2014 | Oh | ........................ | G06F 3/044 174/257 |
| 2015/0370114 A1* | 12/2015 | Du | ..................... | G02F 1/13338 349/12 |

FOREIGN PATENT DOCUMENTS

TW      201502938 A      1/2015

* cited by examiner

*Primary Examiner* — Michael Faragalla
*Assistant Examiner* — Chayce Bibbee
(74) *Attorney, Agent, or Firm* — ScienBiziP, P.C.

(57) ABSTRACT

The disclosure provides a touch sensor layer and a display device. The display device includes a display module and a touch sensor layer. The display module includes a substrate. The touch sensor layer is disposed on the substrate and includes a plurality of touch sensor units defined by a plurality of first non-continuous conducting lines and a plurality of second non-continuous conducting lines cross over each other. A sensor electrode is defined by some of the plurality of touch sensor units connected together.

11 Claims, 9 Drawing Sheets

TOUCH SENSOR LAYER AND DISPLAY DEVICE

FIELD

The subject matter herein generally relates to a touch sensor layer and more particularly, to a display device with a touch sensor layer.

BACKGROUND

Many types of input devices are presently available for performing operations in a computing system, such as buttons, keys, touch sensor panels, and the like. Touch sensor panels, in particular, are becoming increasingly popular because of their ease and versatility of operation as well as their declining price.

Behind the touch sensor panel, a display module can have red, green and blue sub-pixels and black mask patterned in horizontal and vertical directions, parallel to drive lines and sense lines of the touch sensor panel. The pattern formed by the drive lines and the sense lines can have a periodicity different from that of the sub-pixels of the display module and black mask. Because the drive lines and sensor lines may not be entirely clear, the superposition of the touch sensor panel and the display module can cause aliasing effects. As a result, visually unappealing Moire patterns can appear as alternating brighter and darker regions or bands. FIG. 1 illustrates exemplary Moire patterns that can appear when two sets of lines with slightly different pitches are superimposed.

SUMMARY

In an exemplary embodiment, a touch sensor layer includes a plurality of touch sensor units defined by a plurality of first non-continuous conducting lines and a plurality of second non-continuous conducting lines cross over each other and a sensor electrode defined by some of the plurality of touch sensor units connected together.

In an exemplary embodiment, a display device includes a display module including a substrate and a touch sensor layer disposed on the substrate. The ouch sensor layer includes a plurality of touch sensor units defined by a plurality of first non-continuous conducting lines and a plurality of second non-continuous conducting lines cross over each other and a sensor electrode defined by some of the plurality of touch sensor units connected together.

In an exemplary embodiment, a touch sensor layer includes a plurality of first non-continuous conducting lines, a plurality of second non-continuous conducting lines, a plurality of touch sensor units, and a sensor electrode. The plurality of first non-continuous conducting lines is parallel arranged. The plurality of second non-continuous conducting lines is parallel arranged. An angle of 0 to 90 degrees is formed between the plurality of first non-continuous conducting lines and the plurality of second non-continuous conducting lines. The plurality of touch sensor units is defined by the plurality of first non-continuous conducting lines and the plurality of second non-continuous conducting lines cross over each other. The sensor electrode is defined by some of the touch sensor units connected together.

In an exemplary embodiment, a display device includes a display module and a touch sensor layer. The display module includes a substrate. The touch sensor layer is disposed on the substrate. The touch sensor layer includes a plurality of first non-continuous conducting lines, a plurality of second non-continuous conducting lines, a plurality of touch sensor units, and a sensor electrode. The plurality of first non-continuous conducting lines is parallel formed on the touch sensor layer. The plurality of second non-continuous conducting lines is also parallel formed on the touch sensor layer. An angle is formed between the plurality of first non-continuous conducting lines and the plurality of second non-continuous conducting lines. The plurality of touch sensor units is defined where the plurality of first non-continuous conducting lines and the plurality of second non-continuous conducting lines cross over each other. The sensor electrode is defined by some of the touch sensor units connected together.

In an exemplary embodiment, a display device includes a display module and a touch sensor layer. The display module has an array of pixels of different colors sub-pixels and includes a substrate. The touch sensor layer is disposed on the substrate. The touch sensor layer includes a plurality of touch sensor units corresponding to the array of pixels and a sensor electrode. Each of the touch sensor units has four edges. Each edge includes a flat and a recess. Two flats of two adjacent touch sensor units are corresponding to each other to form a connecting area. Two recesses of two adjacent touch sensor units are corresponding to each other to form a silt area. The sensor electrode is defined by some of the plurality of touch sensor units connecting each other.

BRIEF DESCRIPTION OF THE DRAWINGS

Implementations of the present technology will now be described, by way of example only, with reference to the attached figures.

DETAILED DESCRIPTION

Figure 1:
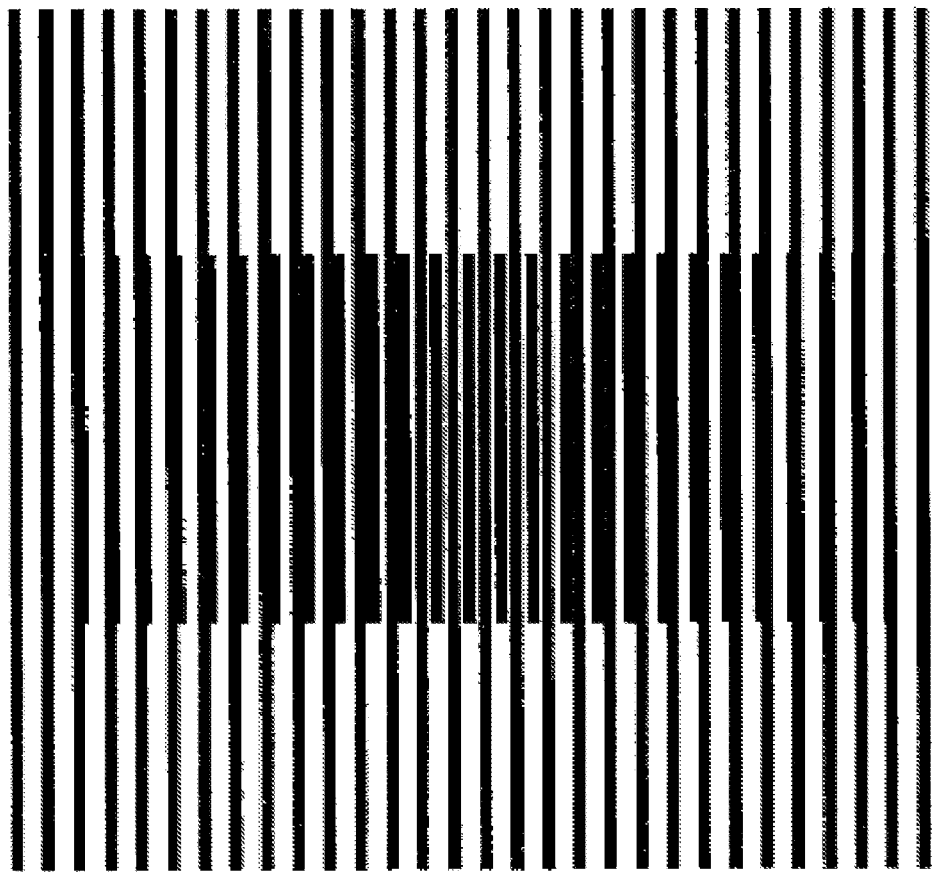
FIG. 1 illustrates an exemplary of Moire patterns that can appear when two sets of lines with slightly different periodicity are superimposed.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

Figure 2:
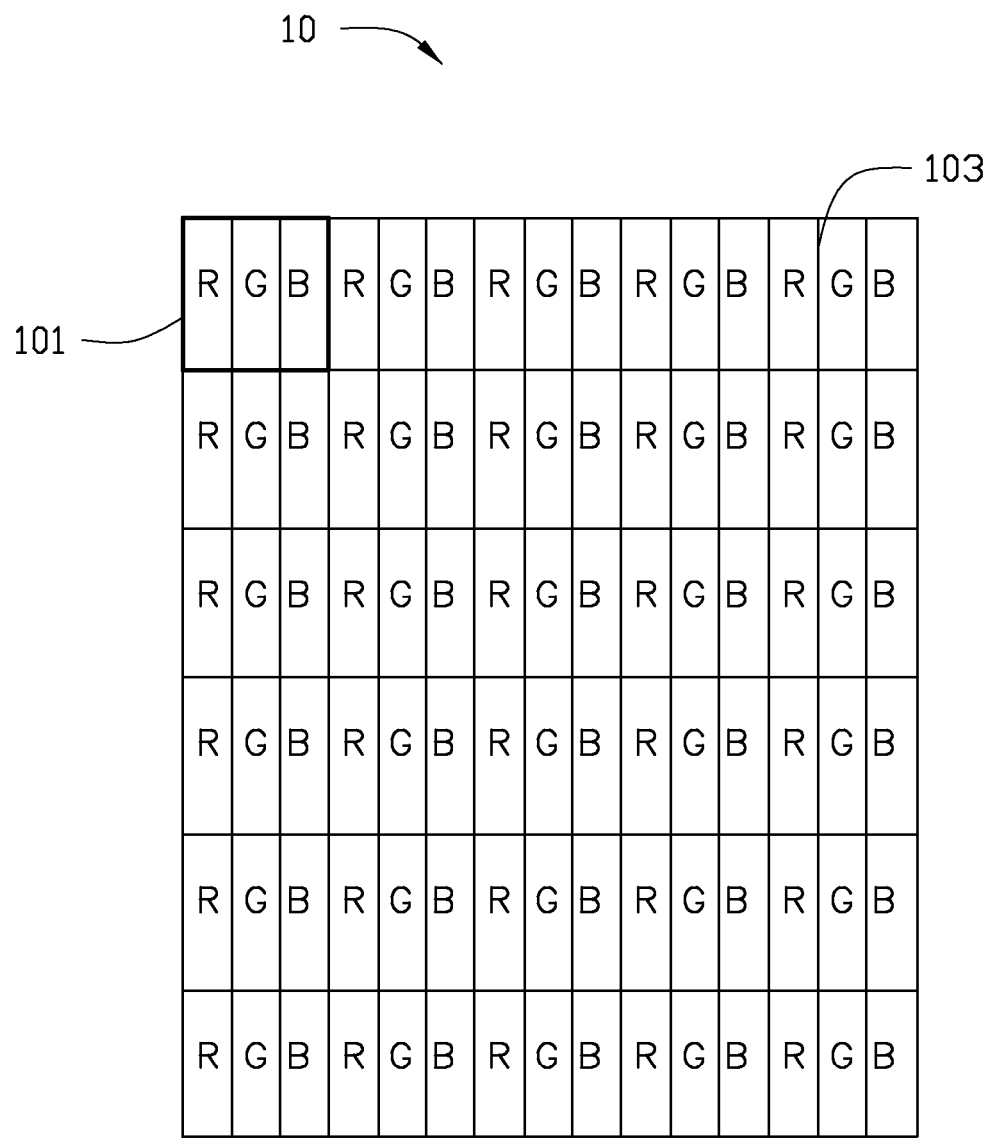
FIG. 2 is a diagrammatic view of a display device of the present disclosure.

In order to reduce Moire effects, there is providing a display device. FIG. 2 illustrates a diagram of a display device 10 of the present disclosure. The display device 10 includes an array of sub-pixels of different colors. As shown in FIG. 2, display device 10 includes a repeating array of red (R), green (G) and blue (B) sub-pixels, each group of R, G and B sub-pixels forming a pixel 101. The sub-pixels are arranged so that the R sub-pixels are linearly aligned with each other in a vertical direction, as are the G sub-pixels and B sub-pixels. The lines separating the sub-pixels can be filled with black mask 103 to reduce light leakage. It is known that the display device 10 may also includes display module, substrate, alignment film, optical film, color filter, driver IC, cover lens, cover glass, connectors (which are not shown in FIG. 2) etc., omitted description here.

Figure 3:
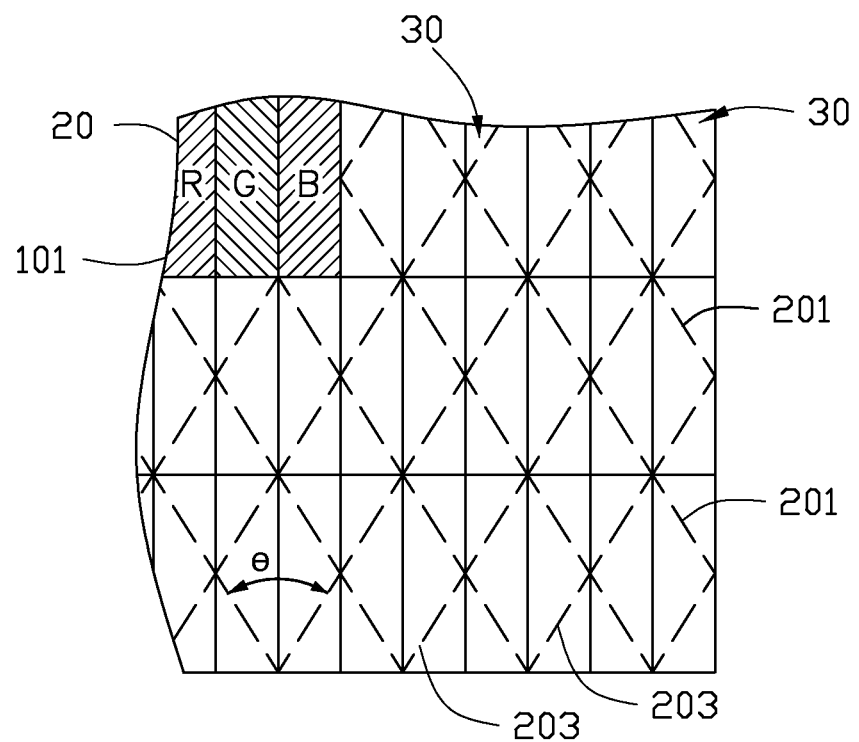
FIG. 3 is a diagrammatic view of a touch sensor layer of the present disclosure.

FIG. 3 illustrates a diagram of a touch sensor layer 20 of the present disclosure. The touch sensor layer 20 is disposed on the display module 10. The touch sensor layer 20 is patterned a plurality of first non-continuous conducting lines 201 parallel arranged thereon, with numbers of connecting areas and slit areas connected continuously. The touch sensor layer 20 is also patterned a plurality of second non-continuous conducting lines 203 parallel arranged thereon, with numbers of connecting areas and slit areas connected continuously. An angle θ is formed between the first non-continuous conducting lines 201 and the second non-continuous conducting lines 203. The angle may be an acute angle. In one embodiment, the angle is between 0 to 90 degrees. In another embodiment, the angle is less 90 degree. In one embodiment, the plurality of first non-continuous conducting lines 201 and the plurality of second non-continuous conducting lines 203 are straight lines.

In one embodiment, the touch sensor layer 20 may be a single Indium Tin Oxide (ITO) layer. In another embodiment, the touch sensor layer 20 may be a single Indium Zinc Oxide (IZO) layer. In another embodiment, the touch sensor layer 20 may be a metal mesh layer.

In one embodiment, the plurality of first non-continuous conducting lines 201 and the second non-continuous conducting lines 203 formed on the touch sensor layer 20 by etching process. In another embodiment, the plurality of first non-continuous conducting lines 201 and the second non-continuous conducting lines 203 formed on the touch sensor layer 20 by printing process. The manufacturing methods mentioned are just some examples, but not limited thereto.

The touch sensor layer 20 is disposed on the display module 10. The display module 10 may include a cover lens, a cover glass, a substrate of a color filter, or a glass substrate (which are not shown in figures). The touch sensor layer 20 may be disposed on the cover lens, the cover glass, the substrate of the color filter, or the glass substrate, as desired.

In FIG. 3, a plurality of touch sensor units 30 is defined by the plurality of first non-continuous conducting lines 201 and the plurality of second non-continuous conducting lines 203 cross over each other. Profile of each touch sensor units 30 is rhombus.

The touch sensor unit 30 is corresponding to the pixel 101. In other words, a periodicity of the touch sensor unit 30 is corresponding to a periodicity of the pixel 101. As shown in FIG. 3, three touch sensor units 30 are corresponding to two pixels 101.

Figure 4:
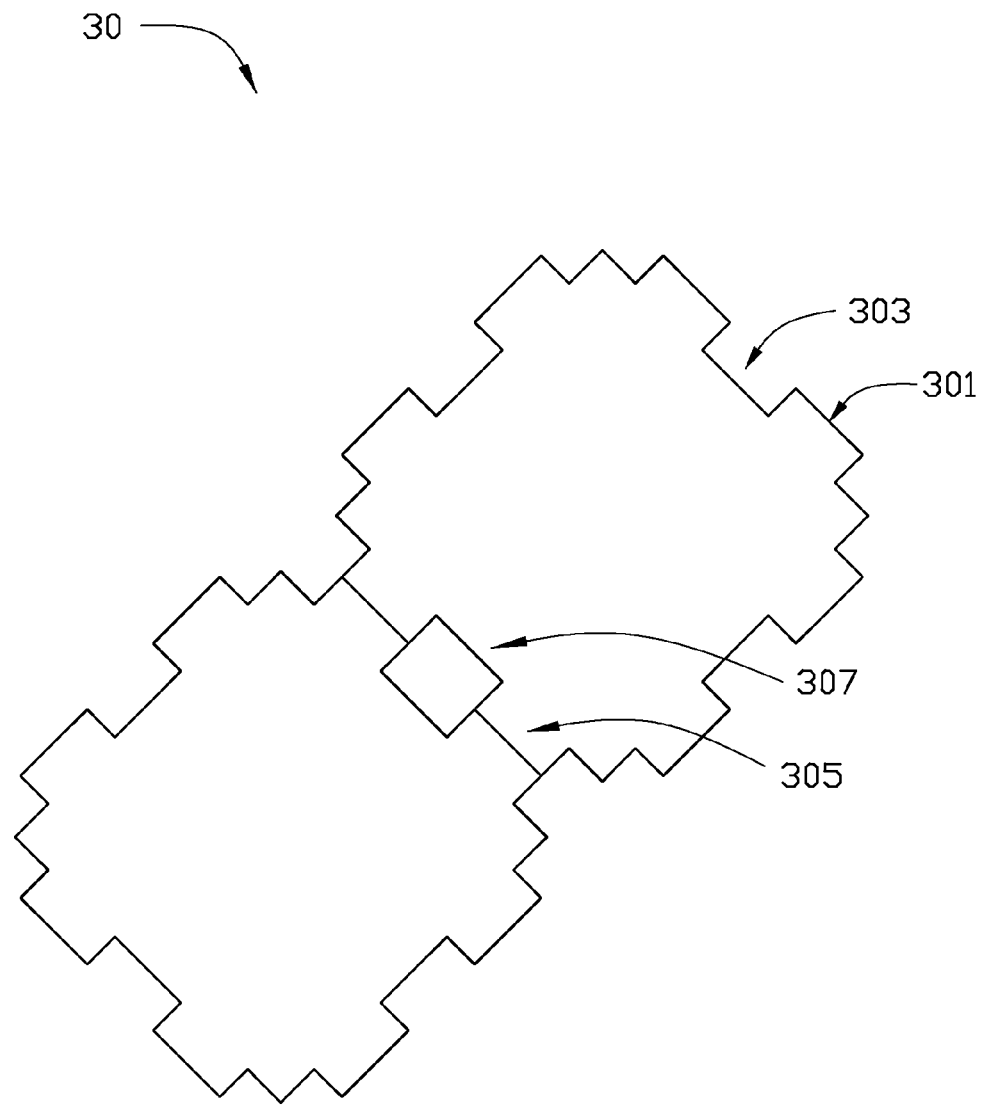
FIG. 4 illustrates an enlarged diagrammatic view of a touch sensor unit of the present disclosure.
Figure 5:
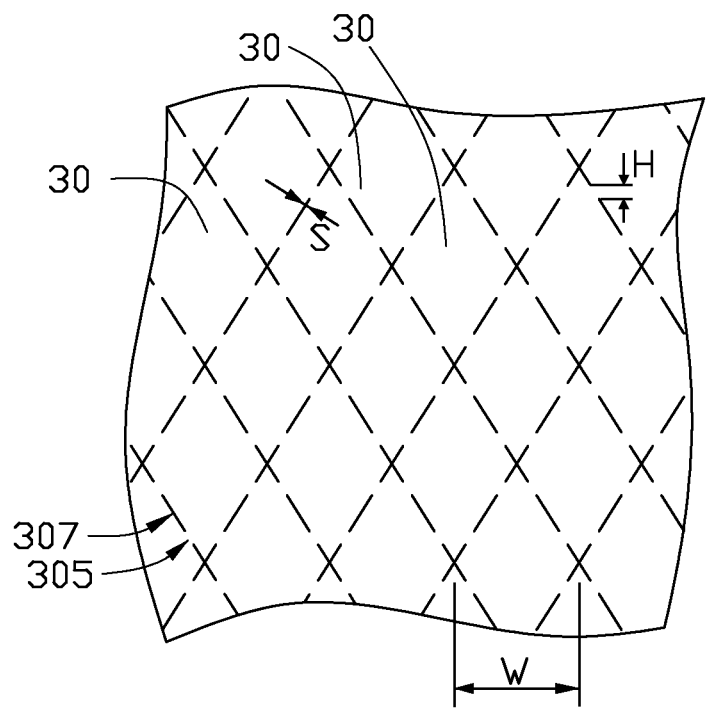
FIG. 5 is an enlarged diagrammatic view of a plurality of touch sensor units of the present disclosure.

FIG. 4 illustrates an enlarged diagram of two touch sensor units 30 of the present disclosure, and FIG. 5 illustrates an enlarged diagram of a plurality of touch sensor units 30 of the present disclosure. Each touch sensor unit 30 is rhombus with four edges. Each edge includes at least one flat 301 and at least one recess 303. When two touch sensor units 30 are next to each other, with each corresponding edges to connect, two flats 301 of these two touch sensor units 30 are corresponding to each other and two recesses 303 of these two sensor units 30 are corresponding to each other. Namely, two flats 301 of two adjacent touch sensor units 30 are corresponding to each other to form a connecting area 305 of the non-continuous conducting lines mentioned above, and two recesses 303 of two adjacent touch sensor units 30 are corresponding to each other to form a slit area 307 of the non-continuous conducting lines mentioned above.

In one embodiment, as shown in FIG. 5, a width W of each touch sensor unit 30 is about 80 μm, a height H of each connecting area 305 is less than 20 μm, and a width S of each slit area 307 is less than 10 μm.

Figure 6:
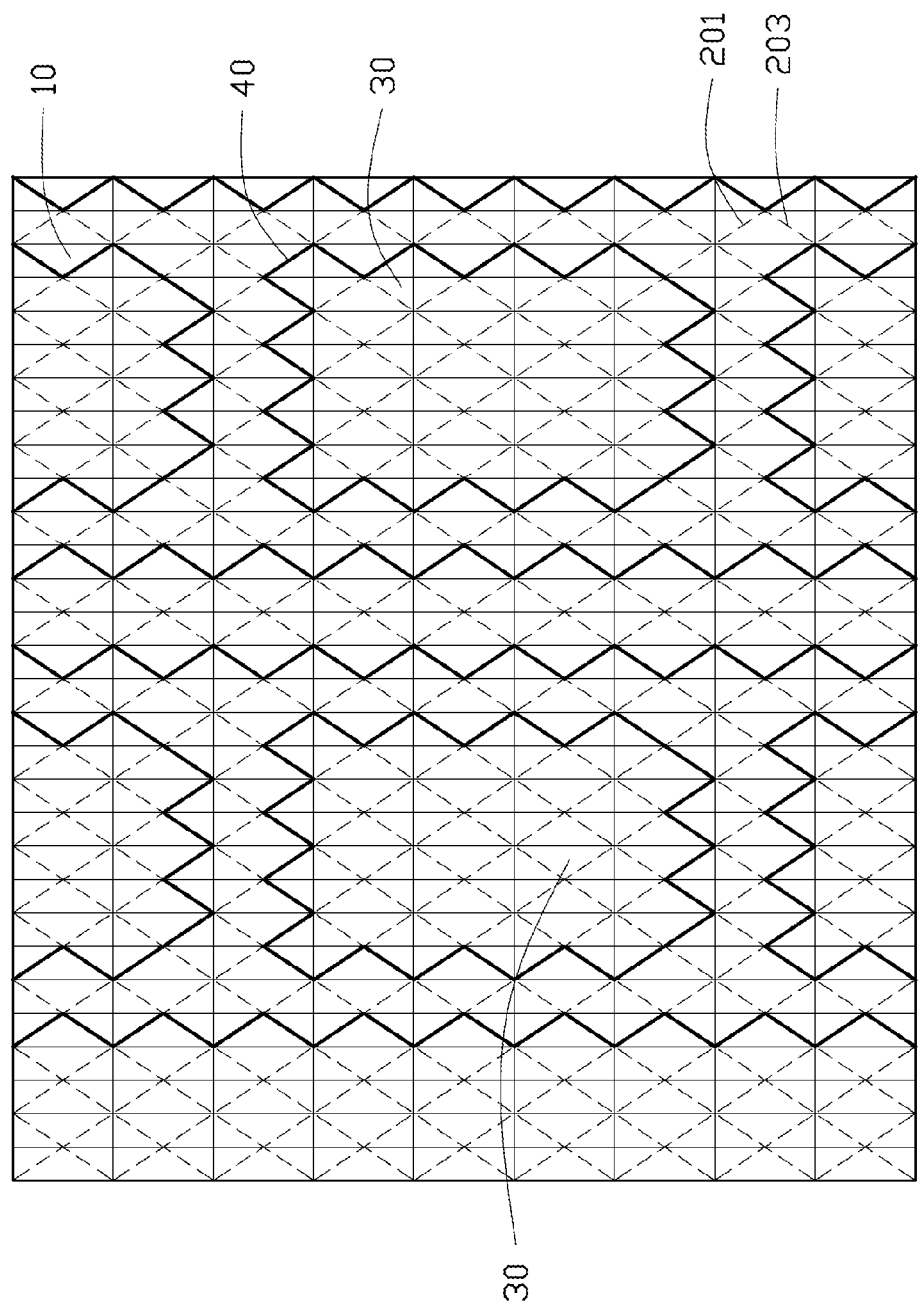
FIG. 6 is a diagrammatic view of a touch sensor layer of the present disclosure.

FIG. 6 illustrates a diagram of a touch sensor layer 20 of the present disclosure. Numbers of touch sensor units 30 defined by the plurality of first non-continuous conducting lines 201 and the plurality of second non-continuous conducting lines 203 cross over each other are arranged on the touch sensor layer 20. A sensor electrode 40 is defined by some of the touch sensor units 30 connected together. In FIG. 6, there are several sensor electrodes 40 defined thereon. More specifically, the sensor electrode 40 is formed by separating some of the connecting areas 305 mentioned above. Therefore, an independent sensor electrode 40 disconnected with other touch sensor units 30 is defined. Due to the sensor electrode 40 is constructed from some touch sensor units 30 connected together, profile of the sensor electrode 40 is serrate shaped. Since the profiles of the sensor electrodes 40 are serrate shaped, Moire effects can be reduced and visibility issue can be improved.

Figure 7:
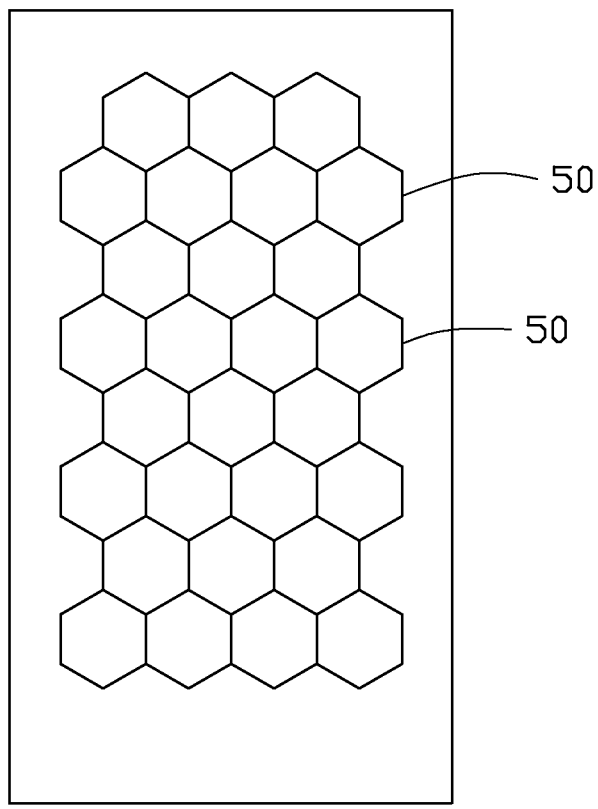
FIG. 7 is a diagrammatic view of an embodiment of sensor electrodes of the present disclosure.
Figure 8:
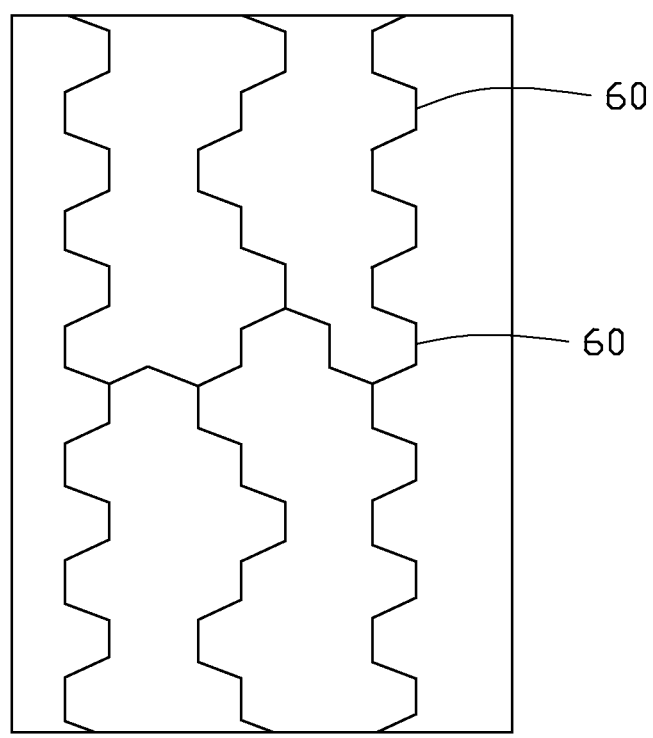
FIG. 8 is a diagrammatic view of an embodiment of sensor electrodes of the present disclosure.
Figure 9:
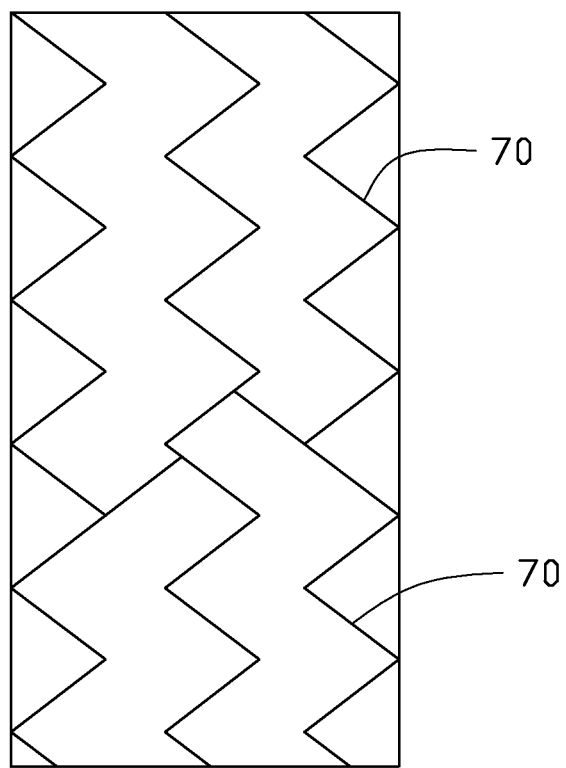
FIG. 9 is a diagrammatic view of an embodiment of sensor electrodes of the present disclosure.

The sensor electrodes may be designed depending on different IC required. FIG. 7 illustrates a diagram of an embodiment of sensor electrodes 50 of the present disclosure. As shown in FIG. 7, profile of the sensor electrode 50 is hexagonal shaped, and the plurality of sensor electrodes 50 defined by some touch sensor units connected together are separated from each other. FIG. 8 illustrates a diagram of another embodiment of sensor electrodes 60 of the present disclosure. As shown in FIG. 8, profile of the sensor electrodes 60 is serrate shaped, and the plurality of sensor electrodes 60 defined by some touch sensor units connected together are separated from each other. FIG. 9 illustrates a diagram of an embodiment of sensor electrodes 70 of the present disclosure. As shown in FIG. 9, profile of the sensor electrodes 70 is serrate shaped, and the plurality of sensor electrodes 70 defined by some touch sensor units connected together are separated from each other. For convenience illustration and simply drawing, the profiles of the sensor electrodes 50, the sensor electrodes 60 and the sensor electrodes 70 shown in FIG. 7-9 are in straight lines, there are serrate shaped actually. Due to the profiles of the sensor electrodes mentioned above are all serrate shaped, Moire effects can be reduced and visibility issue can be improved.

The embodiments shown and described above are only examples. Many details are often found in the art such as the other features of a touch sensor layer or a display device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A display device, comprising:
a display module comprising a substrate;
a touch sensor layer disposed on the substrate;
a plurality of first conducting lines parallel to each other and on the touch sensor layer, each of the plurality of first conducting lines being non-continuous; and
a plurality of second conducting lines parallel to each other and on the touch sensor layer, the plurality of second conducting lines cross over the plurality of first conducting lines, each of the plurality of second conducting lines being non-continuous;
wherein the touch sensor layer is divided into a plurality of touch sensor units, each of the plurality of touch sensor units is made of transparent conductive material and defined by two adjacent first conducting lines of the plurality of first conducting lines and two adjacent second conducting lines of the plurality of second conducting lines; and
wherein the touch sensor layer comprises a plurality of sensor electrode electrically separated from each other, each of the plurality of sensor electrode comprises at least two of the plurality of touch sensor units electrically connected together; the plurality of first conducting lines and the plurality of second conducting lines are straight lines; a profile of each of the plurality of sensor electrodes in the horizontal and vertical directions is serrated shaped.

2. The display device of claim 1, wherein an angle of 0 to 90 degrees is formed between the plurality of first conducting lines and the plurality of second conducting lines.

3. The display device of claim 1, wherein the substrate is a cover lens, a cover glass, a substrate of a color filter, or a glass substrate.

4. The display device of claim 1, wherein the touch sensor layer is a single ITO layer or a single IZO layer.

5. The display device of claim 1, wherein the plurality of first conducting lines and the plurality of second conducting lines are formed on the touch sensor layer by etching or printing.

6. The display device of claim 1, wherein a profile of each of the plurality of touch sensor units is rhombus.

7. The display device of claim 1, wherein a width of each touch sensor unit of the plurality of touch sensor units is about 80 µm.

8. The display device of claim 1, wherein each touch sensor unit of the plurality of touch sensor units has four edges, each edge comprises a flat portion and a recessed portion, the flat portions of two adjacent touch sensor units form a connecting area, and the recessed portions of two adjacent touch sensor units form a slit.

9. The display device of claim 8, wherein a height of the connecting area is less than 20 µm.

10. The display device of claim 8, wherein a width of the slit is less than 10 µm.

11. The display device of claim 1, wherein the profile of each of the plurality of sensor electrodes is defined by at least three of the plurality of second conducting lines and at least three of the plurality of second conducting lines.

* * * * *